Patented Aug. 3, 1926.

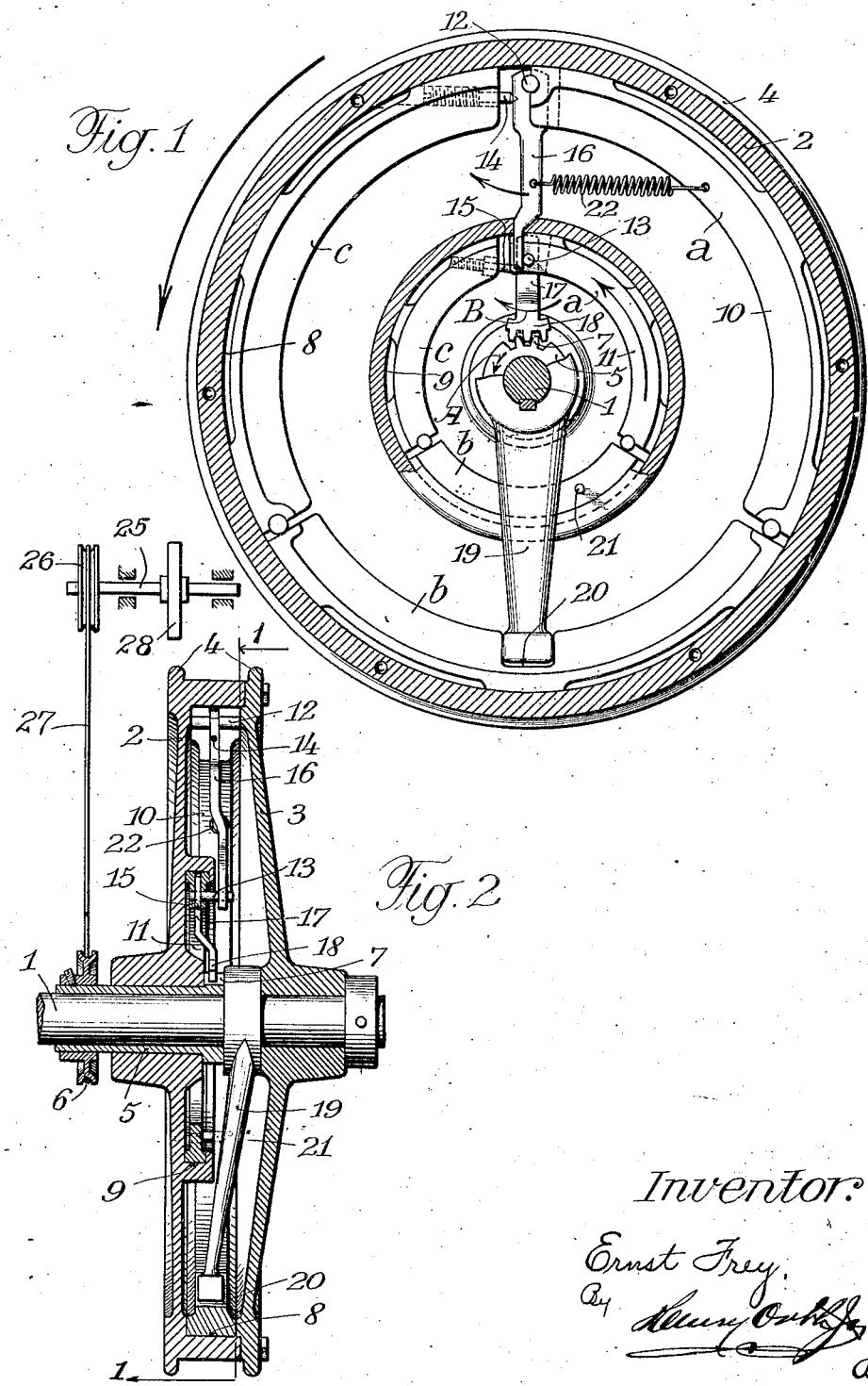

1,594,937

UNITED STATES PATENT OFFICE.

ERNST FREY, OF CHUR, SWITZERLAND.

POWER-TRANSMISSION DEVICE.

Application filed December 27, 1922, Serial No. 609,250, and in Switzerland December 30, 1921.

The invention relates to a device for magnifying weak irregular impulse forces by means of an auxiliary power, particularly in the drive of machines working with a variable angular speed of the main shaft such as printing machines, presses, punches, forging hammers, cutting devices for block presses and the like. The device is characterized by the fact that the impulse force to be magnified actuates, by the intermediary of frictional forces, a mechanism which influences the frictional connection between a source of energy and a member so that the latter is able to transmit a smaller or larger amount of energy to a main shaft of a machine.

The forces are influenced by friction clutches the rubbing faces of which are arranged in a casing common to the friction clutches and loosely mounted on the driven shaft and the movable parts of which comprise expandible rings.

In order to adjust the expandible rings of the friction clutches, levers are arranged in such a manner that a toothed segment provided on one lever co-operates with a toothed segment provided on a sleeve loosely mounted on a driven shaft so that upon a turning movement of the sleeve the turning movement of this lever effects an adjustment of the expandible ring of the auxiliary clutch, which in its turn causes a turning movement of a further lever effecting the adjustment of the main friction clutch.

The regulation of the pressure adapted to produce the friction in the main friction clutch is thus quickly effected and the power transmission device automatically adjusts the amount of power delivered from a source of energy to the main shaft of a machine on which it is mounted.

A constructional example of the transmission device according to the present invention is illustrated on the accompanying drawings, in which:

Fig. 1 is a vertical sectional view, taken on the line 1—1 of Fig. 2 and

Fig. 2 is a cross-section.

Upon the driven shaft 1 a casing consisting of two disks 2, 3 bolted together is loosely mounted, the casing forming a belt pulley provided with two flanges 4 serving to guide a transmission belt (not shown in the drawing), by means of which the driving power is imparted. To one end of a sleeve 5, which is loosely mounted on the driven shaft, a member such as a cord pulley 6, which is actuated as hereinafter described, is rigidly connected. The sleeve 5 carries at its other end situated within the casing 2, 3 a toothed segment 7. The disk 2 on its inner side is provided with two cylindrical facings 8 and 9 respectively with which the adjustable coupling rings 10 and 11 respectively cooperate; each of the rings consists of three parts $a$, $b$, $c$ between the end faces of which, pins are provided for a pivot joint between adjacent parts. Facing 8 and ring 10 are the operative members of the power transmission device or the main friction coupling and facing 9 and ring 11 represent the operative members of the auxiliary friction coupling. The parts $a$ of the two rings 10, 11 are provided with pins 12 and 13 respectively and in the parts $c$ axially displaceable pins 14 and 15 respectively are mounted. The pin 12 acts as fulcrum to a lever 16, the free end of which co-operates with the pin 13. The latter serves as fulcrum to a lever 17 which is provided at its free end with a toothed part 18 which is in mesh with the toothed segment 7. An arm 19 is rigidly fixed to the driven shaft 1 and projects into a recess 20 of the part $b$ of the ring 10. A pin 21 is provided on the part $b$ of the ring 11 in order to limit the swinging movement of the arm 19 as a pressure of the latter against the pin 21 causes an angular displacement of the parts $a$, $b$, $c$, of the auxiliary clutch and thereby a turning of the lever 16, whereby the main friction clutch is brought to a tight grip, thus preventing a further turning movement of the arm 19. A coil spring 22 is interposed between the lever 16 and part $a$ of the ring 10 in order to contract the ring 10 with the impulse forces cause a turning motion of the sleeve 5 contrary to the direction of the arrow A.

The impulse forces may be generated in any manner and transmitted to the pulley 6 as illustrated in Fig. 2. In said figure is shown a shaft 25 the speed of which is independent of the speed of the shaft 1 of the machine which machine shaft has to run at a speed which is always in a determined ratio to the speed of the shaft 25. To this end the latter is provided with a cord pulley 26 driving by means of a cord 27 the pulley 6 fixed to the sleeve 5, and the shaft 25 may be rotated by a belt pulley 28 transmitting a weak power.

When the speed of the shaft 25 increases or decreases, the pulley 6 and the sleeve 5 will lead or lag relatively to the shaft 1 of the machine and the impulse forces are generated by these differences in the speeds. When the device comes to a stop the spring 22 pulls lever 16 against pin 13 on the part $b$ of ring 11 and turns the ring until the pin 21 comes to rest against arm 19.

The operation of the above described device is as follows:

The impulse forces which are generated by the difference in speed between the cord pulley and driven shaft acting on the cord pulley 6 cause a turning moment of the sleeve 5 and thereby of the toothed segment 7, for instance in the direction of the arrow A. Owing to the cooperation of the toothed segment 7 and the toothed part 18 the lever 17 swings in the direction of the arrow B, whereby it presses against the pin 15 and causes an expansion of the ring 11 which is pressed against the facing 9 and is caused to take part in the rotation of the casing 2, 3 rotated at a uniform speed by the driving power. The pin 13 of the ring 11 causes the lever 16 to be turned around the fulcrum 12 in the direction of the arrow shown in Fig. 1, whereby the ring 10 is expanded and is caused to take part in the rotation of the casing 2, 3. By means of the arm 19 the rotating movement is transmitted to the driven shaft 1. The angular velocity of the casing 2, 3 is chosen greater than the maximum angular velocity of the cord pulley so that a certain amount of slip occurs always between the casing and the rings 10 and 11. As soon as there is a difference between the angular velocity of the cord pulley and the angular velocity of the driven shaft an impulse force is caused by the retardation or the acceleration of the cord pulley which immediately effects an adjustment of the auxiliary friction coupling 9, 11. By this adjustment the small impulse force is magnified and the magnified force performs the adjustment of the transmission device, i. e. the main friction coupling 8, 10 whereby more or less output is transmitted to the driven shaft. In this manner the power transmitted to a driven shaft is very effectively regulated.

I claim:

1. A power transmitting device for controlling the amount of power transmitted to a driving shaft of a machine from a driving agent, comprising in combination, a main shaft for driving the machine, a member adapted to be automatically adjusted by impulse forces generated upon an alteration of the speed of a part of said machine, an auxiliary friction clutch, means operatively connected to said member and adapted to adjust said auxiliary friction clutch, a main friction clutch adapted to transmit the driving power from the driving agent to said main shaft, and means interposed between said auxiliary friction clutch and said main friction clutch to adjust the latter in accordance with said impulse forces and to automatically adjust the amount of driving power to said main shaft in dependency upon the speed of a part of said machine.

2. A power transmitting device for controlling the amount of power transmitted to a driving shaft of a machine from a driving agent, comprising in combination a casing, a main shaft for driving the machine, a member adapted to be automatically adjusted by impulse forces generated upon an alteration of the speed of a part of said machine, an auxiliary friction clutch, means operatively connected to said member and adapted to adjust said auxiliary friction clutch, a main friction clutch one part of which being acted upon by the power to be transmitted and the other part being positively connected to the driven shaft, said auxiliary and main friction clutches being arranged in said casing common to both, and means interposed between the auxiliary and main clutches to adjust the main clutch in accordance with the impulse forces.

3. A power transmitting device for controlling the amount of power transmitted to a driving shaft of a machine from a driving agent, comprising in combination, a casing a main shaft for driving the machine, a member adapted to be adjusted by impulse forces generated upon an alteration of the speed of a part of said machine, an auxiliary friction clutch, comprising an expandible ring in frictional engagement with a facing, means operatively connected to said member for effecting an adjustment of said expandible ring, a main friction clutch comprising an expandible ring in frictional engagement with a facing and positively connected to the driven shaft, the facings of the auxiliary friction clutch and of the main friction clutch being arranged in said casing common to both clutches and rotated by a driving power, and means interposed between the rings of said auxiliary and main clutches to adjust the latter by the impulse forces.

4. A power transmitting device comprising a casing, a driven shaft, a bush loosely mounted on said shaft, a member fixed to said bush and influenced by impulse forces causing a turning motion of said bush, a toothed segment provided on said bush, an auxiliary friction clutch comprising an expandible ring in frictional engagement with a facing, a lever pivotally mounted on said ring and adapted to expand the latter, a toothed part on the free end of said lever co-operating with said toothed segment, a main friction clutch comprising an expandible ring in frictional engagement with a facing and positively connected to the driven shaft, the facings of the auxiliary friction clutch and of the main friction clutch being arranged in said casing loosely mounted on said bush and rotated by a driving power, a lever pivotally mounted on the ring of the main clutch and adapted to expand the latter, and a pin on the ring of the auxiliary clutch and co-operating with the free end of said last named lever.

5. A power transmitting device for controlling the amount of power transmitted to a driving shaft of a machine from a suitable prime mover, comprising in combination with the shaft of the machine to be driven, a constantly driven sleeve, means to permit the automatic variation of the speed of the sleeve, a casing member loose on the shaft and to be driven from any prime mover, main clutching means engaging said member, a driving connection between said main clutching means and the shaft, and a second clutch device between said sleeve and casing member and operating the main clutching means.

In testimony whereof I affix my signature.

ERNST FREY.